(12) United States Patent
Saviranta et al.

(10) Patent No.: US 6,347,311 B1
(45) Date of Patent: *Feb. 12, 2002

(54) IMPLEMENTATION OF SERVICE INDEPENDENT BUILDING BLOCKS

(75) Inventors: Tapio Saviranta; Jukka Aakula; Eeva Hartikainen, all of Helskinki (FI)

(73) Assignee: Nokia Networks Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,411

(22) Filed: Nov. 15, 1999

Related U.S. Application Data

(63) Continuation of application No. PCT/FI98/00417, filed on May 15, 1998.

(30) Foreign Application Priority Data

May 16, 1997 (FI) .................................................. 972108

(51) Int. Cl.$^7$ .............................................. G06F 17/00
(52) U.S. Cl. ......................................... 706/57; 707/104
(58) Field of Search ............................. 706/57; 707/104

(56) References Cited

U.S. PATENT DOCUMENTS 5,138,713 A    8/1992  Loten ......................... 709/104
5,838,768 A  * 11/1998  Sumar et al. ............... 379/207

(List continued on next page.)

FOREIGN PATENT DOCUMENTS

| DE | 4445651 | 6/1996 |
| EP | 0365728 | 5/1990 |
| EP | 0751453 | 1/1997 |
| EP | 0817016 | 1/1998 |
| WO | WO95/34175 | * 12/1995 |

OTHER PUBLICATIONS

Abramowski et al, "Service Modelling for Multi–Party Calls", IEEE Intelligent Network '94 Workshop, May 1994.*

Sehyeong Cho, "A Rapid Prototype of IN using a production system", IEEE Intelligent Network '94 Workshop, May 1994.*

(List continued on next page.)

*Primary Examiner*—George B. Davis
(74) *Attorney, Agent, or Firm*—Altera Law Group

(57) ABSTRACT

When implementing services compiled of service independent building blocks (SIB) in an intelligent network, the SIB parameters to be relayed in computer instructions are replaced with a global data structure, whereby no parameters at all are transferred in the instruction call. Having no parameters means that each SIB receives the parameters it needs from one global variable. The global variable is visible to all SIBs, whereby each individual SIB fetches the parameters it requires from it. As regards some SIBs it is rather certain that they will remain unchanged and thus really service independent, but for some there is no such certainty, and for this reason the SIBs may be divided logically into two groups: assisting and performing SIBs respectively. Parameters of the performing SIBs are not relayed in the sub-programme call, but in one or several global data structure variables. The global variable is some data structure which is suitable for the purpose and in the fields of which the assisting SIBs place their information and from the fields of which the performing SIBs fetch the information they need. In the placing and fetching of information reference is made to a field of the data structure with the aid of an unambiguous field identifier. In addition, use of the information is conditional so that the information will be used only if the information differs from a certain initialisation value. In this way it is ensured that the building blocks (SIB) to be used in the implementation of telecommunication services in an intelligent network are service independent.

4 Claims, 3 Drawing Sheets

U.S. PATENT DOCUMENTS

| | | | | |
|---|---|---|---|---|
| 5,881,144 A | * | 3/1999 | Havens et al. | 379/203 |
| 5,894,574 A | * | 4/1999 | Whited | 717/1 |
| 5,946,383 A | * | 8/1999 | Havens et al. | 379/207 |
| 5,991,803 A | * | 11/1999 | Glitho et al. | 707/220 |
| 6,003,031 A | * | 12/1999 | Hartikainen et al. | 707/10 |
| 6,005,845 A | * | 12/1999 | Svennesson et al. | 370/260 |
| 6,044,142 A | * | 3/2000 | Hammarström et al. | 379/223 |
| 6,044,259 A | * | 3/2000 | Hentilä et al. | 455/406 |
| 6,055,302 A | * | 4/2000 | Schmersel et al. | 379/207 |
| 6,058,303 A | * | 5/2000 | Åström et al. | 455/413 |

OTHER PUBLICATIONS

Carvalho et al, "Service Creation Environment for IN CS1", IEEE Intelligent Network '94 Workshop, May 1994.*

Willner et al, "IN Service Creation Elements: Variations on the Meaning of a SIB", IEEE Intelligent Network Workshop, May 4–7, 1997.*

Suzuki et al, "A Software structure for flexible IN service operations", IEEE Intelligent Network Workshop, May 4–7, 1997.*

Bernard S. Ku, "a Reuse–Driven Approach for Rapid Telephone Creation", IEEE Proceedings of the 3rd Inter. Conf. on Software Reuse, Nov. 1994.*

Bernard S. Ku, "A Reuse–Driven Service Creation Environment for the Advanced Intelligent Network", IEEE International Conference on Communications, May 1994.*

Huan–Wen, Tzeng, "The Design of Distance–Learning Service Creation Environment", IEEE Proceedings of Frontiers in Education Conference, Nov. 1996.*

Evelina Pentcheva, "An Object–Oriented Data Model for Intelligent Network Services", IEEE, Proceedings of the 3rd IEEE International Conference on Electronics, Circuits and Systems, Oct. 1996.*

Molva et al, "Strong authentication in Intelligent Networks", IEEE 3rd Annual International Conference on Universal Personal Communications.*

Ku, Bernard S., "A Reuse–Driven Approach for Rapid Telephone Service Creation", IEEE Proceedings Advances in Software Reuse, Mar. 1993.*

"Turbo Pascal Advanced Techniques" Ohlsen, Que Corp. vol. 1, 1989, p. 67.

* cited by examiner

IMPLEMENTATION OF SERVICE INDEPENDENT BUILDING BLOCKS

This application is a continuation of international application serial number PCT/FI98/00417, filed May 15, 1998.

FIELD OF THE INVENTION

This invention concerns implementation of service independent building blocks (SIB). These building blocks are used for building intelligent network services.

TECHNICAL BACKGROUND

The demand for support and production of various services has directed the trend in telecommunication networks towards the so-called Intelligent Network (IN). The intelligent network can be defined as an architecture that can be applied to most telecommunication networks irrespective of the network technology. It aims at bringing about telecommunication service's providing an additional value and at control and management of these. It is a special feature of the intelligent network to provide modular functions which are independent of the service used and which may be connected to one another as components when developing new services, whereby it is easier to define and design new services. Another special feature is that the supply of services is independent of the telecommunication network. The services are separate from the lowermost physical network structure, which means that they can be distributed.

CCITT defines the Intelligent Network Conceptual Model (INCM) in the CS-1 (Capability Set 1) recommendation. The model includes four planes, each of which represents an abstract view of the possibilities offered by the intelligent network. FIG. 1 shows the conceptual model from the viewpoint of service logic.

The top plane is called the Service Plane (SP) and it determines how the service will appear to its user. The view contains no information on the implementation of services in the intelligent network. The service includes one or several lowermost components of this plane, the Service Feature (SF). The SF is the smallest part of the service discernible to the user. They may be used in the same way as building blocks for building new complex services.

The second topmost plane of the model is the Global Functional Plane containing a view of the intelligent network as service independent standards and as Service Independent Building Blocks (SIB), from which the service characteristics and services discernible on the topmost plane are collected with the aid of service logic. The Basic Call Process (BCP) covering the entire network and the Point of Initiation (POI) and Point of Return (POR) between the BCP and the SIB also belong to this plane. For each service feature SF of the preceding service plane there are Global Service Logic (GSL) items on this plane which at the stage of service creation make use of SIBs located on the other side of the interface. The service plane SF includes one SIB or several SIBs. In principle, the SIB is a sub-programme the operation of which is well defined.

The second lowermost plane is called the Distributed Functional Plane (DFP). It is divided into Functional Entities (FE) and interactive relations between these. The SIBs of the preceding plane include Functional Entity Actions (FEA) included in the functional entities. Each entity may perform tasks of different types. Inside each functional entity most tasks may be performed as one or several sub-functions. On this plane, the SIB of the upper plane is implemented by a Distributed Service Logic (DSL) utilising the functional entities FE of this functional plane and any functions provided by the connections set up by them. One global service logic GSL of the global functional plane leads to one or several service logics X, Y, Z . . . on the distributed functional plane.

The lowest plane, the Physical Plane, is formed by Physical Entities (PE) supporting tasks of the distributed functional plane, by interfaces between these and by protocols. On this plane, the service logic may be installed and performed by any physical item including a control function of the concerned service. The behaviour of the item is determined by the functional entity on the preceding DF plane.

SIBs of the global functional plane are examined more closely in the following.

FIG. 2 is a graphic view of the SIB process. The following matters can be distinguished in each SIB:

1) the logical origin from which the SIB's function begins, 2) the input parameters used by SIB in its function, 3) the output parameters resulting from SIB's function, and 4) the logical end where SIB's function ends.

ETSI does not define different SIBs by name nor their function, but defines the exchange of messages taking place in the telephone exchange. Through it the standard also affects the SIBs.

Examined from the viewpoint of the service, the SIBs form a list wherein the names of SIBs and the parameters needed by the SIBs are listed. The service is carried out in such a way that the list is gone through and individual SIBs are performed. This is illustrated in FIG. 3 where there are a number of n SIBs in the list. At first the instruction pointer IP points at the start of the list and after performance of an individual SIB the pointer is moved forward by one instruction to the next point or a jump is made to some other point in the list and the SIB located there is performed.

The objective is that the SIBs would be service independent, in other words, the same SIBs could be used in the implementation of different services. Validation A is an example of this kind of service. It should also be noticed that different versions may be required of the same service. One teleoperator may need such a validation A which includes a replacing number A, whereas another teleoperator wants validation A without any replacing number A.

In terms of programming technology, SIB can be implemented as a sub-programme. Firstly, the sub-programme call must hereby relay the parameters used to the sub-programme implementing the SIB and, secondly, compiling is typically associated with the fact that the number or type of parameters to be relayed in the sub-programme call can not be changed without changing the source code. The final outcome is that SIB can not be implemented service independently, if its parameters are relayed in the sub-programme call.

Service independence is prevented by the circumstance in particular that it is not possible to be sure of whether the number and type of parameters are the same in any new service programmes as in the present service programmes. It has been necessary in practice to supplement the set of SIBs and to change existing SIBs into another form and it has been especially necessary also to change the number of parameters. The problem then has been constantly to change sub-programme interfaces generally so that more information, that is, more parameters than before must be relayed to the SIB. This again has meant that as the sub-programme interface changes a new version must be made of the programme, even though the need for new versions is somewhat dependent both on the programming language and on the programming method.

If trouble occurs, corrections must be made in several programme versions. The occurrence of software versions causes a need for maintenance, which again reduces the quality of the software and increases costs. In addition, the existence of numerous different versions causes an increased need of documentation.

It is not quite simple in terms of programming technology to implement SIBs without a sub-programme mechanism. On the other hand, a sub-programme mechanism will cause occurrence of source code versions as well as the problems described in the foregoing.

It is an objective of the present invention to bring about a method making sure that implemented SIBs are really service independent. The objective is achieved with the attributes presented in the independent claims.

BRIEF SUMMARY OF THE INVENTION

According to a first characteristic feature of the invention, no SIB set is defined especially, but the SIBs are instead divided logically into two groups: assisting and performing SIBs respectively. This is done because one can be rather sure as regards some SIBs that they will remain unchanged and thus truly service independent, but there is no certainty as regards some, and this is the fundamental reason why the SIBs are divided into assisting and performing ones.

The assisting SIBs perform simple and clearly limited tasks, whereby one can be sure that the number and type of parameters will remain unchanged also in the future.

The tasks of performing SIBs are larger than the tasks of assisting SIBs and changes may occur in them. The parameters of performing SIBs are not relayed in the sub-programme call, but in one or several global data structures.

The two other characteristic features of the invention will be studied in connection with the detailed description of the invention. The said characteristic features illustrate the use of a global variable.

LIST OF FIGURES

The invention will be described more closely with the aid of the appended schematic figures of which FIG. 1 shows a conceptual model of an intelligent network;

DETAILED DESCRIPTION OF THE INVENTION

According to a first characteristic feature of the invention, the SIBs are thus divided logically into two groups: assisting and performing SIBs respectively.

The assisting SIBs perform such tasks that the number and type of parameters will surely be standard irrespective of in which service programme the SIBs are used now and in the future.

The performing SIBs are such that the number or type of their parameters may change, which again will lead to the problems mentioned in the presentation of the state of the art in this patent application. The problems are avoided in such a way that parameters of performing SIBs are not relayed in the sub-programme call, but in one or several global variables. In this case, the global variable is a data structure and the information stored in its fields is available to all sub-programmes. Such a data structure may be an already existing data structure of the software or it may be created separately.

It is another special feature of the invention that an unambiguous identifier refers to each field of the data structure used as the global variable.

Such a data structure called CID is used as an example in the following which contains Call Instant Data.

The CID data structure includes the following fields:

```
CID_REC
   1 : calling_party      —Subscriber A
   2 : called_party       —Subscriber B
   ...
END_REC_CID
```

In the service programme, reference is made to fields of the CID data structure based on an unambiguous identifier, in this case a sequence number, e.g. sequence number one (1) refers to subscriber A and sequence number two (2) refers to subscriber B etc. If the programme code of SIBs is included in the interpreter, the internal sequence numbers (1 and 2 above) of the interpreter are kept unchanged. Any new fields are added to the end of the CID data structure and they will have their own sequence numbers in a consecutive sequence of numbers.

Figure 4:
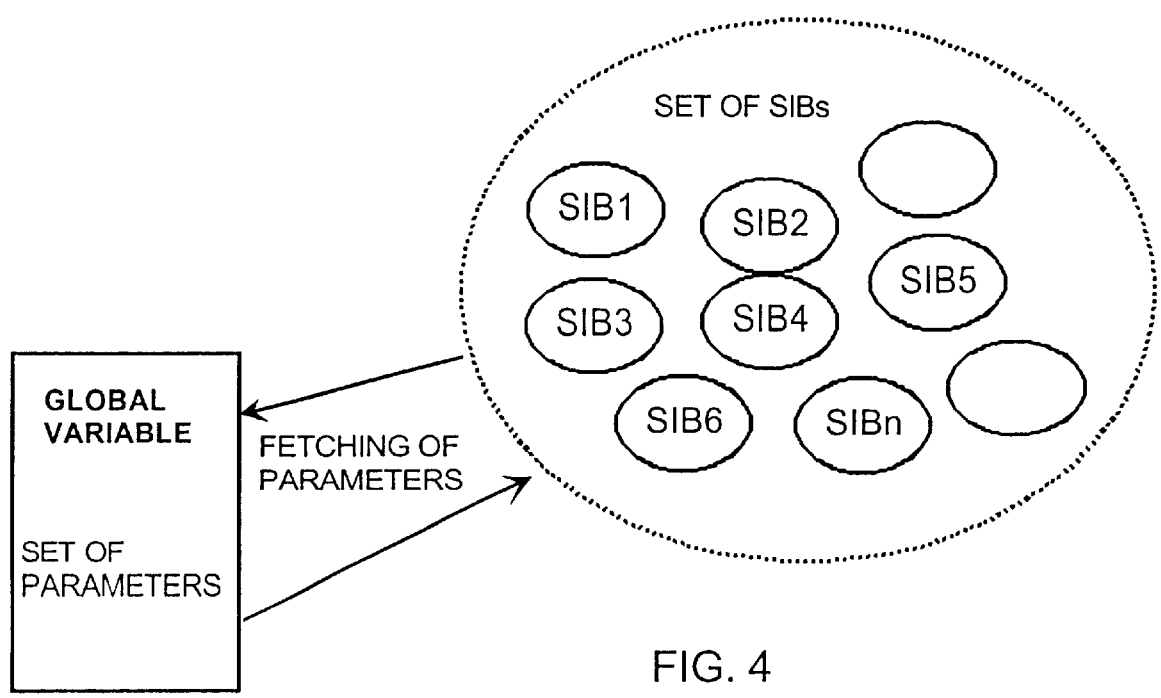
FIG. 4 illustrates the use of a global variable.

What was said earlier will now be illustrated with the aid of FIG. 4. When it is the turn of service programme SIB to perform, the concerned SIB fetches the information it needs from the data structure which is a global variable. SIB performs its functions using the information it has fetched.

Assisting SIBs will be described with the aid of two SIBs as examples. Their names are given by the applicant, but SIBs performing functions of a similar kind are found also in intelligent network software of other manufacturers.

The first example SUD_TO_CID is an assisting SIB fetching individual subscriber information from the Service Support Data database and placing it in the CID data structure mentioned above. This SIB has two parameters, one of which indicates which subscriber information is fetched from the database while the other parameter indicates in which field of the CID data structure the subscriber information is placed.

Figure 1:
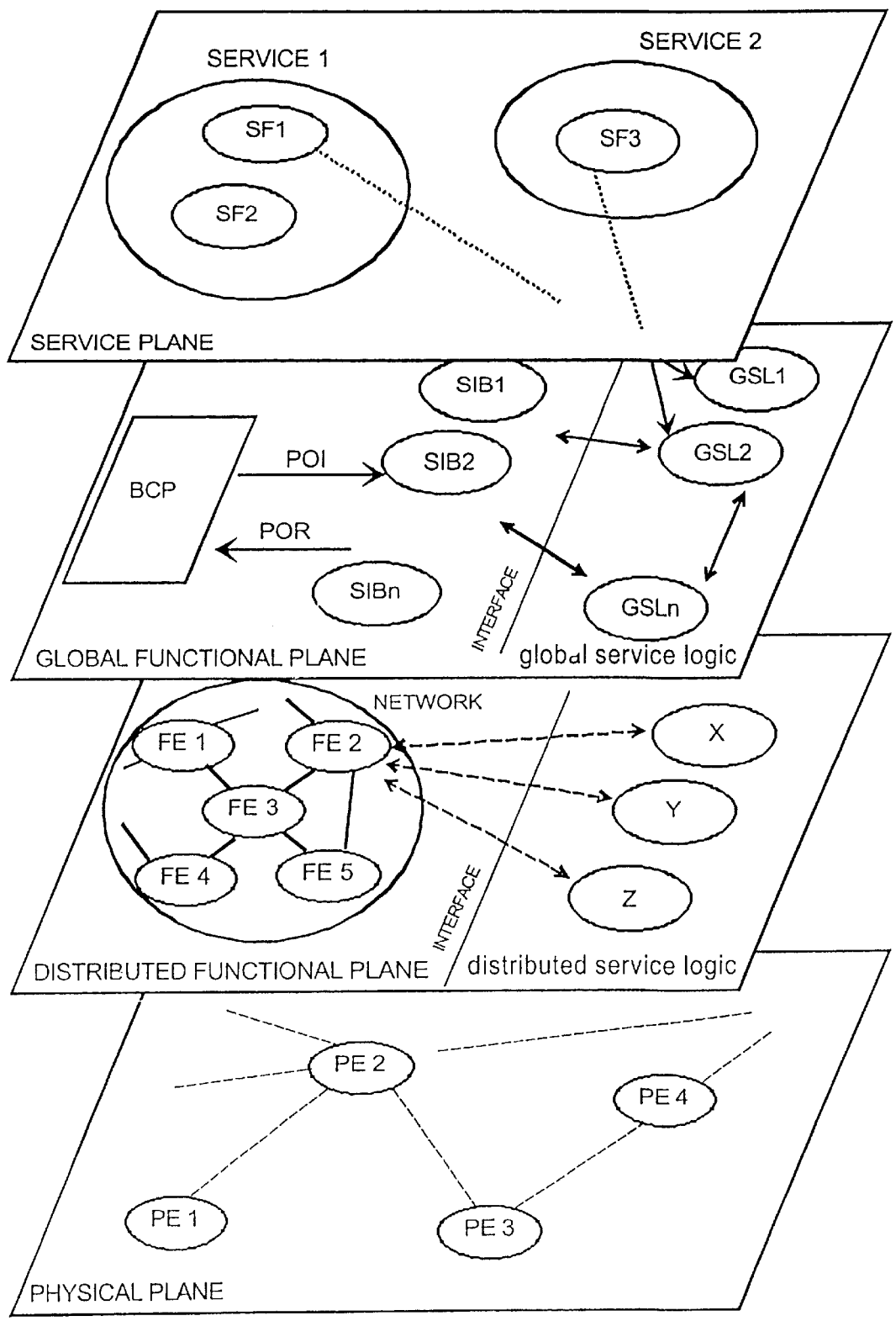
Figure 2:
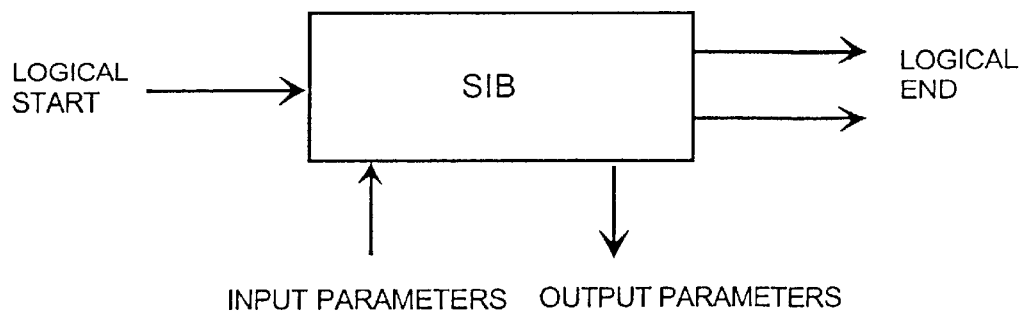
FIG. 2 shows a service independent building block.
Figure 3:
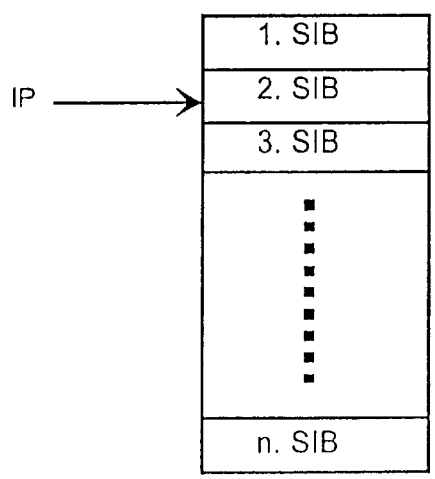
FIG. 3 illustrates the performance of SIBs.
Figure 5:
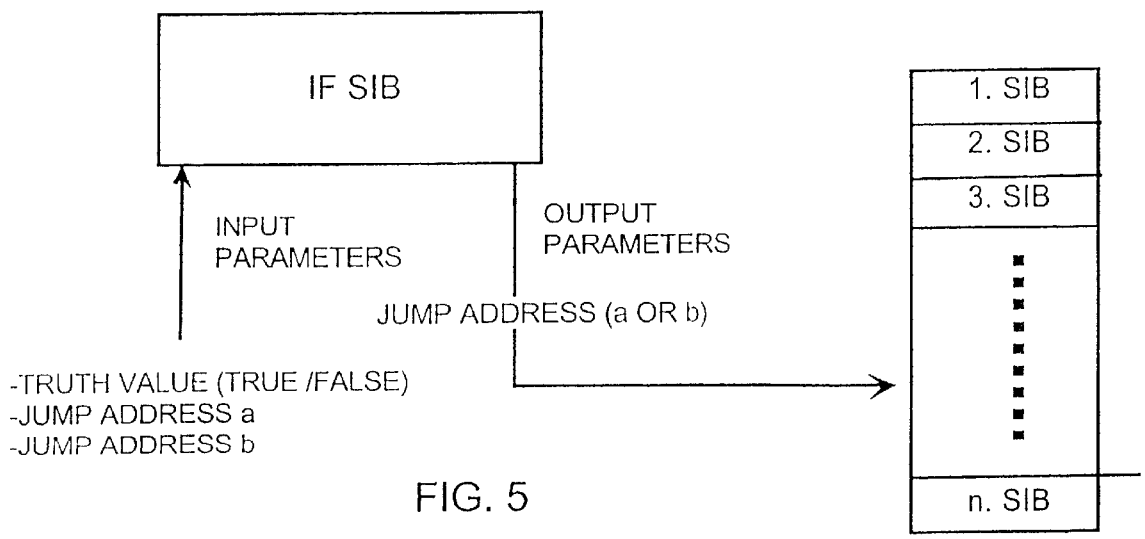
FIG. 5 shows an assisting SIB.

The other example IF shown in FIG. 5 is an assisting SIB which has three input parameters. The first parameter is a truth value (true/false), the second parameter is a jump address a, to which the function will move if the truth value is true, and the third parameter is a jump address b, to which the function will move if the truth value is false. The jump address (a or b) resulting from SIB's performance moves the IP pointer shown in FIG. 3 to the SIB referred to in the jump address, whereupon this SIB is performed. It is obvious that a SIB of this type will remain unchanged as time passes: two truth values can hardly produce anything else than two output values, which are given in the input parameters. It is rather useless to use a global variable in such a case.

Figure 6:
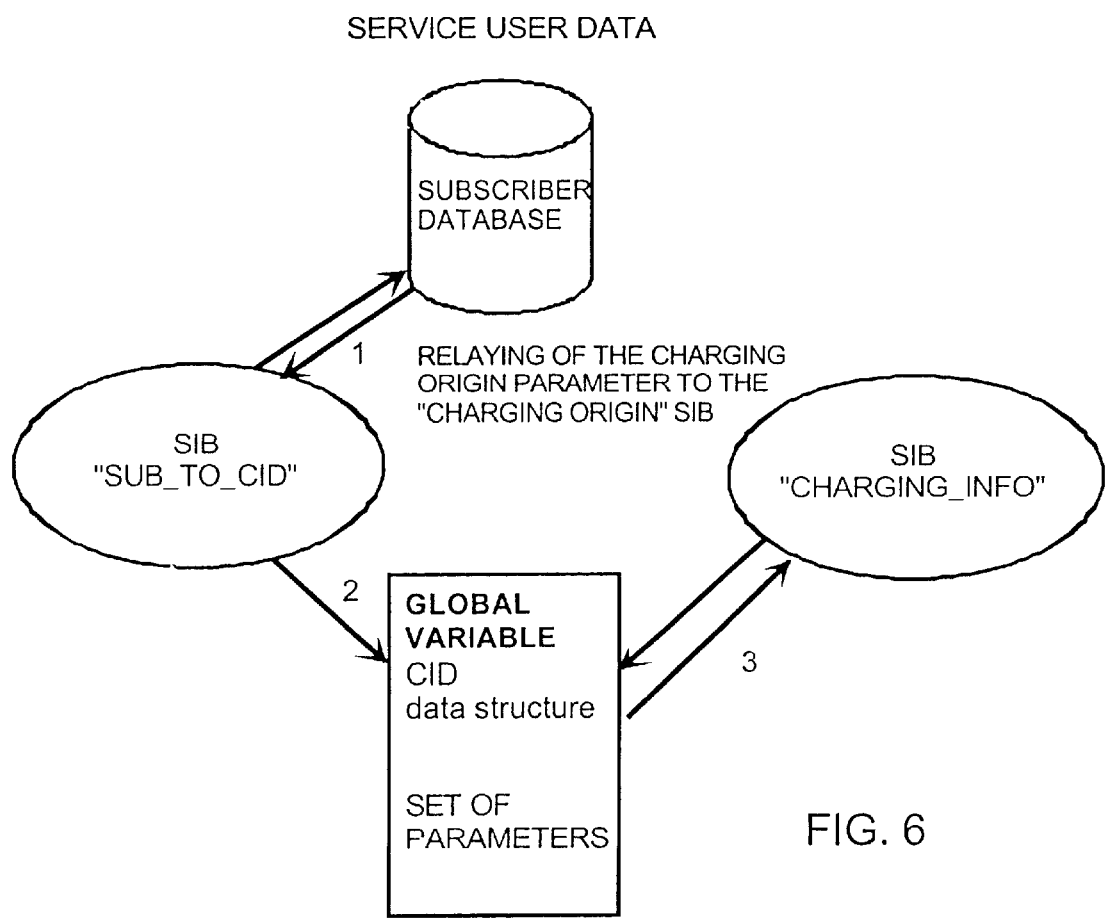
FIG. 6 shows a performing SIB.

The tasks of performing SIBs are larger than those of assisting SIBs. As an example of a performing SIB, FIG. 6 mentions CHARGING_INFO which provides the call control with information relating to charging, such as the subscriber number and the charging origin. A performing SIB is typically preceded by one or several assisting SIBs. The CHARGING_INFO SIB mentioned above is preceded by such a SUD_TO_CID wherein the charging origin information is fetched from the subscriber database and it is placed in a certain field of the CID record. When it is the turn of CHARGING_INFO SIB to perform, it will obtain from the CID record the charging origin information it needs.

By changing certain SIBs to be parameter-less it is possible to prevent any occurrence of several versions of the source code as a result of changes in the number of parameters. It is not necessary to change all SIBs to be parameter-less, because their number will (almost surely) remain the same. The SIB IF which was mentioned earlier can be implemented naturally so that it has three parameters, one of which indicates the reference operation while the two other parameters contain values which are compared with each other. On the other hand, the SIB which performs a connection procedure by the name of CONNECT and defined in the Core Inap standard and which sends an in_connect_s message to the Service Switching Point (SSP) is of that type of SIB that the number of parameters may vary. For this reason, it is worth while to implement CONNECT-SIB as a SIB without parameters which receives the information it needs from the global variable.

It is a third characteristic feature of the invention that use of the information contained in the global variable is conditional. The information is used only in the case that the information differs from a certain initialisation value.

The third characteristic feature concerns implementation of the programme code of SIBs. Implementation of SIBs may be based on known interpreter technology in such a way that the programme code of SIBs is included in the interpreter. The interpreter hereby reads a service programme formed by SIB names and SIB parameters and it then performs the programme code of the SIB.

An example of a SIB relating to the third characteristic feature is presented, wherein the SIB's task is to "connect" a call. It is assumed that the SIBs are implemented by interpreter technology and it is assumed that new information, analyse_tree_index, should be used in CONNECT SIB. When a global variable, that is, a CID data structure is used and CONNECT SIB is implemented as a parameter-less SIB, then the following change is made in the CID data structure

| CID_REC | |
|---|---|
| 1 : calling_party | —Subscriber A |
| 2 : called_party | —Subscriber B |
| . . . | |
| x : analyse_tree_index | — analyse tree index |
| END_REC_CID | | wherein the sequence number x of the addition is the first unused sequence number.

In addition, a change of the following kind is made to CONNECT-SIB in the interpreter:

IF analyse_tree_index IS NOT initialise_value THEN USE analyse_tree_index

The analyse_tree_index information may be taken to the CID record e.g. with the aid of the R_TO_CID SIB. R_TO_CID is an assisting SIB having two parameters. One parameter refers to some R register while the other refers to a field in the CID data structure, in the present case to field X.

The "old" service programme does not recognise field X in the CID data structure, which means that it does not set up any value for the analyse_tree_index information, whereby the initialisation value is the analyse_tree_index information.

Thus, the idea is that the interpreter functions as before from the viewpoint of the "old" service programme. On the other hand, the "new" service programme may use the analyse_tree_index information, since the steps relating to the information are conditional, that is, they will be performed only if the analyse_tree_index value differs from a certain initialisation value (0 is a common initialisation value).

What is claimed is:

1. A method of a special implementation of service independent building blocks for use in service programmes in an intelligent network, each service independent building block having a name and at least one of service independent building block's having at least one parameter, the method comprising:

forming a set of assisting building blocks, said set containing the service independent building blocks having parameters of which number and type are unchangeable;

forming a set of performing building blocks, said set containing the service independent building blocks having parameters of which number and type are changeable;

setting an identifier to each field of a data structure used as a global variable, said setting enables the service independent building blocks to place a parameter in the field or fetch parameter from the field by referring to the identifier;

forming a service programme by using names and parameters of the service independent building blocks, and during an execution of the service programme, relaying the parameters of the assisting building blocks in sub programme calls;

placing the parameters of the performing building blocks in the global variable; and fetching the parameters of the performing building blocks from the global variable.

2. The method as defined in claim 1, wherein a new parameter of a performing building block is introduced so that a new field is added to the data structure used as the global variable and an unambiguous identifier is set to the new field, and before the execution of the service programme, the new field is initialized with a predetermined initialization value.

3. The method as defined in claim 2, wherein use of the new parameter is conditional, wherein the new parameter does not have to be added to existing service programmes.

4. The method as defined in claim 3, wherein the performing building block uses the new parameter only if a value of the new field differs from the predetermined initialization value.

* * * * *